United States Patent
Williams et al.

(10) Patent No.: US 9,109,844 B2
(45) Date of Patent: Aug. 18, 2015

(54) NESTED HELICAL FIN TUBE COIL AND ASSOCIATED MANUFACTURING METHODS

(71) Applicant: Rheem Manufacturing Company, Atlanta, GA (US)

(72) Inventors: Kevin G Williams, Thousand Oaks, CA (US); Juan C Montanez, Oxnard, CA (US)

(73) Assignee: Rheem Manufacturing Company, Atlanta, GA (US)

( * ) Notice: Subject to any disclaimer, the term of this patent is extended or adjusted under 35 U.S.C. 154(b) by 311 days.

(21) Appl. No.: 13/738,157

(22) Filed: Jan. 10, 2013

(65) Prior Publication Data

US 2013/0228321 A1    Sep. 5, 2013

Related U.S. Application Data

(60) Provisional application No. 61/605,380, filed on Mar. 1, 2012.

(51) Int. Cl.

| | |
|---|---|
| *B21D 53/06* | (2006.01) |
| *B23P 15/26* | (2006.01) |
| *F22B 37/10* | (2006.01) |
| *F28F 13/12* | (2006.01) |
| *F28D 7/02* | (2006.01) |
| *F28F 1/36* | (2006.01) |
| *F28F 1/14* | (2006.01) |
| *B21D 53/02* | (2006.01) |
| *B21D 11/06* | (2006.01) |
| *F24H 1/16* | (2006.01) |
| *F28F 13/06* | (2006.01) |
| *F28F 1/24* | (2006.01) |
| *F28F 1/26* | (2006.01) |

(Continued)

(52) U.S. Cl.
CPC . *F28F 1/14* (2013.01); *B21D 11/06* (2013.01); *B21D 53/027* (2013.01); *B21D 53/06* (2013.01); *F24H 1/0081* (2013.01); *F24H 1/165* (2013.01); *F28D 7/024* (2013.01); *F28F 1/24* (2013.01); *F28F 1/26* (2013.01); *F28F 13/06* (2013.01); *B23P 15/26* (2013.01); *F24H 1/43* (2013.01); *Y10T 29/49378* (2015.01)

(58) Field of Classification Search
USPC ................ 165/125, 169, 184, 156, 163, 181; 29/890.046, 890.048; 122/235.17, 122/367.3
See application file for complete search history.

(56) References Cited

U.S. PATENT DOCUMENTS

| | | | | |
|---|---|---|---|---|
| 1,963,857 | A | * | 6/1934 | Lucas et al. .................... 165/184 |
| 2,021,117 | A | * | 11/1935 | Lucke ............................ 165/184 |
| 2,371,144 | A | * | 3/1945 | Bronander .................... 165/182 |

(Continued)

*Primary Examiner* — Leonard R Leo
(74) *Attorney, Agent, or Firm* — Haynes and Boone, LLP

(57) ABSTRACT

A heat exchanger, illustratively utilized in a fuel-fired pool heater, circumscribes a burner operative to discharge hot combustion gases outwardly through the heat exchanger. The heat exchanger has a tube portion helically coiled about an axis, with a series of heat transfer fins circumscribing the tube portion and spaced apart along it length. The fins on longitudinally adjacent pairs of coils of the tubing have nested facing edge portions which collectively form a seal area that coils between the tubing portion adjacent coil pairs in axially spaced relationships therewith, the seal area substantially impeding combustion gas flow therethrough in a direction generally transverse to the axis of the heat exchanger. Additionally, the fins have deformed laterally outer portions that define a coiled, circumferentially spaced series of restricted combustion gas outlets in substantial axial alignment with the helically coiled tube portion.

18 Claims, 3 Drawing Sheets

(51) Int. Cl.
*F24H 1/00* (2006.01)
*F24H 1/43* (2006.01)

(56) References Cited

U.S. PATENT DOCUMENTS

| | | | |
|---|---|---|---|
| 2,529,545 A * | 11/1950 | Edwrds | 165/184 |
| 2,696,368 A * | 12/1954 | Edwards | 165/184 |
| 3,696,861 A | 10/1972 | Webb | |
| 3,701,381 A | 10/1972 | Watts | |
| 3,809,061 A | 5/1974 | Gerstmann | |
| 3,867,981 A * | 2/1975 | Monroe | 165/182 |
| 4,116,270 A * | 9/1978 | Marushkin et al. | 165/184 |
| 4,348,794 A | 9/1982 | Kim et al. | |
| 4,434,841 A * | 3/1984 | Jackson et al. | 165/125 |
| 4,669,533 A * | 6/1987 | Hehl | 165/163 |
| 4,721,068 A * | 1/1988 | Bassols Rheinfelder et al. | 165/182 |
| 5,163,508 A * | 11/1992 | Hamos | 165/181 |
| 5,617,916 A | 4/1997 | Shigenaka et al. | |
| 5,687,678 A * | 11/1997 | Suchomel et al. | 122/250 R |
| 5,967,228 A * | 10/1999 | Bergman et al. | 165/184 |
| 6,810,836 B1 * | 11/2004 | Ferguson et al. | 122/367.3 |
| 6,948,455 B2 * | 9/2005 | Ferguson et al. | 122/367.3 |
| 7,650,933 B2 * | 1/2010 | Gilbert et al. | 165/159 |
| 2003/0066632 A1 * | 4/2003 | Bishop et al. | 165/163 |
| 2005/0072562 A1 | 4/2005 | Hall | |
| 2007/0289723 A1 | 12/2007 | Koster et al. | |
| 2009/0242184 A1 * | 10/2009 | Mishima et al. | 165/181 |
| 2011/0041781 A1 * | 2/2011 | Deivasigamani et al. | 165/184 |
| 2011/0197610 A1 * | 8/2011 | Debesa | 165/181 |

* cited by examiner

NESTED HELICAL FIN TUBE COIL AND ASSOCIATED MANUFACTURING METHODS

CROSS-REFERENCE TO RELATED APPLICATION

The present application claims the benefit of the filing date of provisional U.S. patent application Ser. No. 61/605,380 filed Mar. 1, 2012. The entire disclosure of the provisional application is hereby incorporated herein by this reference.

BACKGROUND OF THE INVENTION

The present invention generally relates to heat exchanger coil apparatus and associated manufacturing methods, and in an illustrative embodiment thereof more particularly relates to helical fin/tube heat exchanger coil apparatus, representatively incorporated in a fuel-fired pool heater, and associated manufacturing methods.

In various previously proposed liquid heating applications the liquid to be heated is suitably circulated through helically coiled heat conductive tubing having secured thereto a longitudinally spaced series of heat conductive fins that encircle the tubing. A burner encircled by the helically coiled fin/tube heat exchanger coil generates hot combustion gases that are forced laterally outwardly through the coil and function to heat the liquid flowing through the tubing portion thereof. Various well known problems, limitations and disadvantages are commonly associated with this type of liquid heating apparatus.

For example, the burner-generated hot combustion gases tend to flow outwardly between the adjacent tubing coil pairs, via the gaps between the fin portions of the heat exchanger structure , thereby undesirably "bypassing" the tubing coils and lessening the overall heat transfer efficiency of the coil structure. In an effort to direct more of the hot combustion gases over the tubing, separate baffle structures have been secured to the fin/tube assembly, between the tubing coils, to channel more of the combustion gases directly over the tubing instead of through the spaces between the tubing coils. While this corrective measure tends to increase the heat transfer efficiency of the heat exchanger it undesirably adds to the weight, complexity and cost of the heat exchanger. It also undesirably increases the difficulty in constructing the heat exchanger, while still permitting a significant portion of the hot combustion gases to exit the heat exchanger without efficiently contacting the tubing portion thereof.

As can be seen from the foregoing, a need exists for a coiled fin/tube heat exchanger coil construction that addresses these problems, limitations and disadvantages associated with helically coiled fin/tube heat exchanger coils of the general type described above. It is to this need that the present invention is primarily directed.

DETAILED DESCRIPTION

Figure 1:
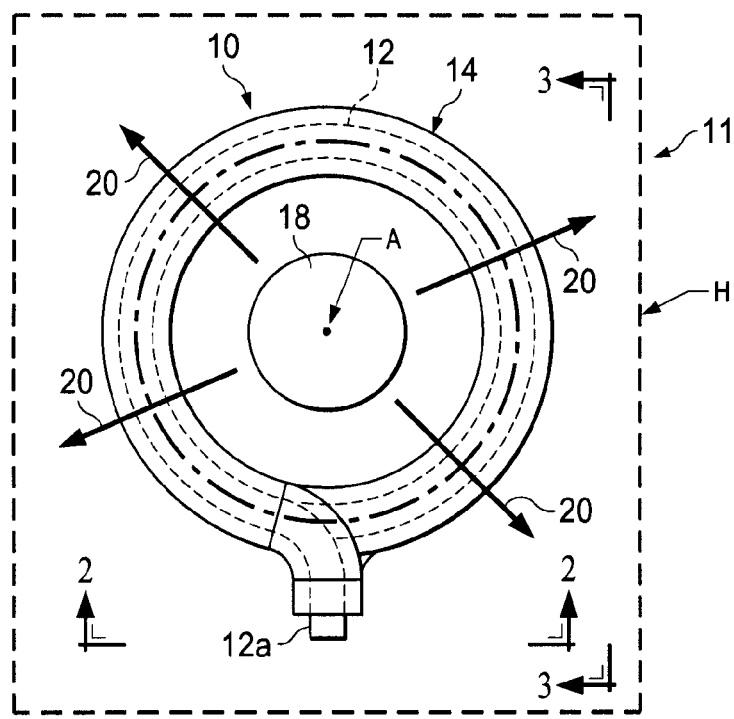
FIG. 1 is a simplified, partially phantomed top plan view of a representative fuel-fired pool heater operatively incorporating the helical fin/tube heat exchanger coil.
Figure 2:
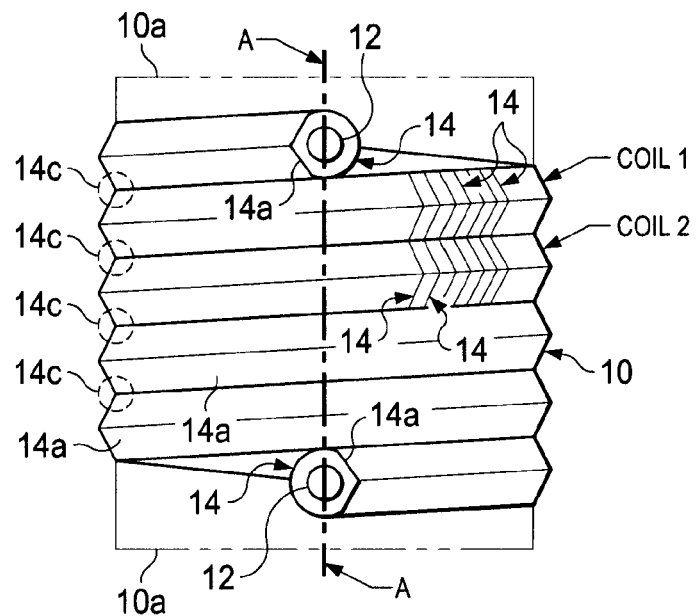
FIG. 2 is a side elevational view of the coil taken along line 2-2 of FIG. 1.
Figure 3:
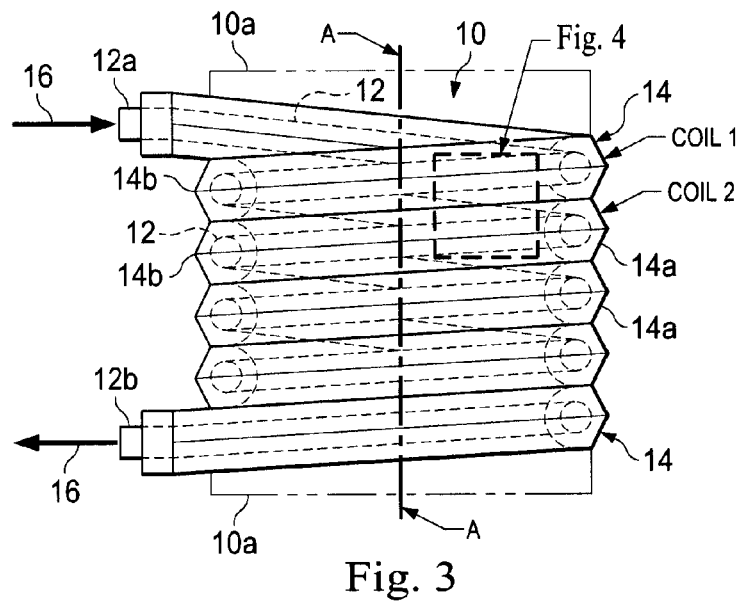
FIG. 3 is a side elevational view of the coil taken along line 3-3 of FIG. 1.

Referring initially to FIGS. 1-3, the present invention provides a specially designed helical fin/tube heat exchanger coil 10 which is illustratively incorporated in fluid heating apparatus representatively in the form of a fuel-fired pool heater 11. The heat conductive coil 10 comprises helically wound metal tubing 12 on which a spaced series of metal fins 14 are externally secured in a suitable manner. Preferably, the fins 14 are formed integrally with the tubing 12, and have initially circular shapes when viewed parallel to the length of the tubing 12, but could alternatively be separate fin structures attached to the tubing 12 and have other initial shapes.

Illustratively, the coil 10 is a water tube type coil in which pool water 16 (see FIG. 3) is pumped through the tubing 12 (via inlet and outlet portions 12a,12b thereof) and heated by a tubular gas or other type of fuel burner 18 (see FIG. 1) circumscribed by the coils of the heat exchanger 10 and operative to discharge hot combustion gases 20 radially outwardly across the tubing 12 and through the fins 14.

Coil 10 has a tubular configuration in which its tubing coils spiral about a longitudinal axis A (see FIG. 2) Suitable non-perforate cover structures 10a (shown in phantom in FIGS. 2 and 3) being suitably secured over the opposite coil ends to prevent hot combustion gas flow axially outwardly through the coil ends. Alternatively, the tubing 12 could spiral about the axis A in a manner such that the tubing coil diameters are not all equal as illustratively shown herein.

Figure 4:
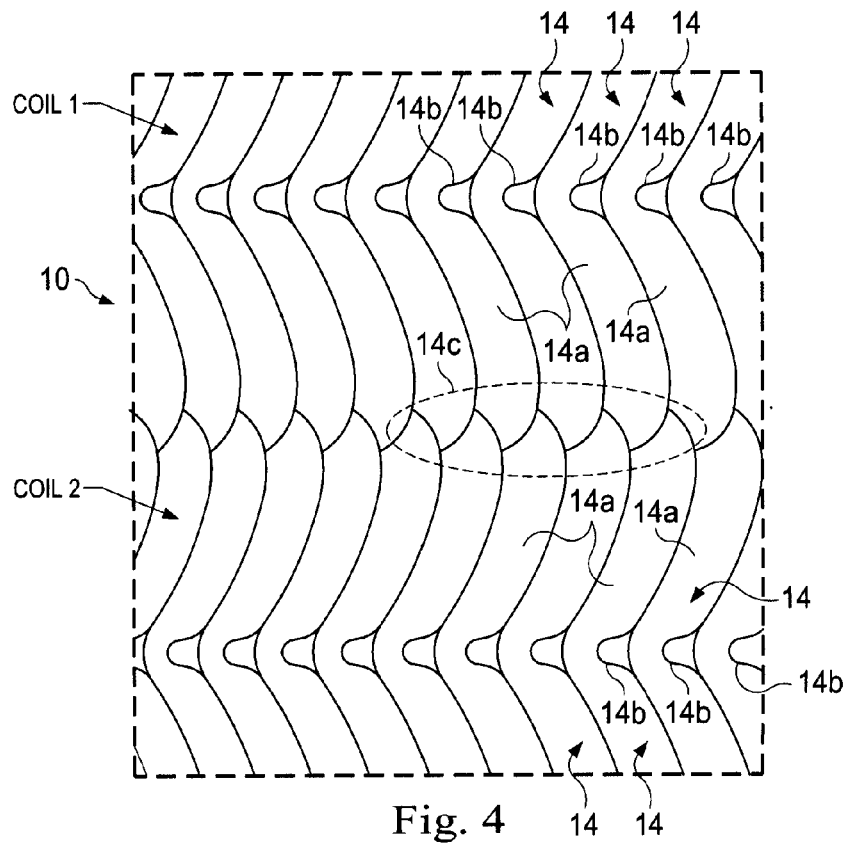
FIG. 4 an enlargement of the dashed rectangular side elevational area "4" of the coil in FIG. 3.

Referring now additionally to FIG. 4, to improve the heat transfer efficiency of the helical fin/tube coil 10, laterally outer side portions 14a of the fins 14 are laterally inwardly bent and circumferentially folded over one another (as may be best seen in FIG. 4) to generally triangular configurations to form at the apexes of the generally triangularly deformed coil portions 14a hot gas discharge baffle outlet areas 14b (outwardly through which the hot combustion gases 20 are discharged during operation of the burner 18) along the circumferences of the helical arrays of fins 14. These baffle area outlets 14b are in a spiraling array which is axially aligned with the coils of tubing 12 and in a radially outwardly spaced apart relationship therewith. Discharge baffle outlet areas 14b serve to desirably concentrate the flow of hot gases 20 transversely across the coiled tubing 12, as opposed to discharging the hot gases 20 between the tubing coils, to thereby improve the overall heat transfer efficiency of the coil 10.

The present invention further improves the overall heat transfer efficiency of the coil 10 by configuring it in a manner such that, as may be best seen in FIGS. 2 and 4, the facing edges of the folded fin portions 14a in each adjacent pair of heat exchanger coils (for example, coils 1 and 2 in FIGS. 2 and 4) are axially "nested" (i.e., interdigitated) as at 14c. The nested fin areas 14c form, in effect "seals" between the axially adjacent heat exchanger coil pairs to inhibit hot gas outflow therebetween which would undesirably bypass the tubing 12 being heated by the hot combustion gases 20. By having such seal areas formed by the fins themselves, as opposed to having to construct the seal areas from separate components, the coil manufacturing costs are desirably lowered in addition to improving the heat transfer efficiency of the coil 10.

Figure 5A:
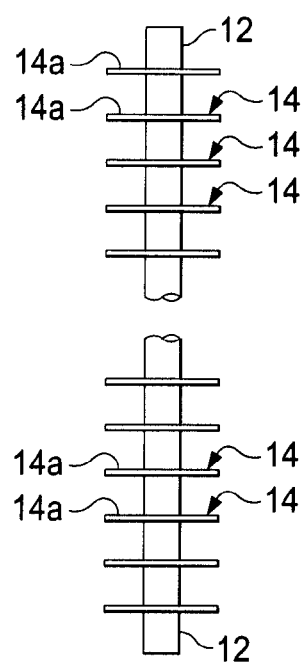
FIGS. 5A-5C are highly schematic figures that sequentially illustrate a method of manufacturing the coil.
Figure 5B:
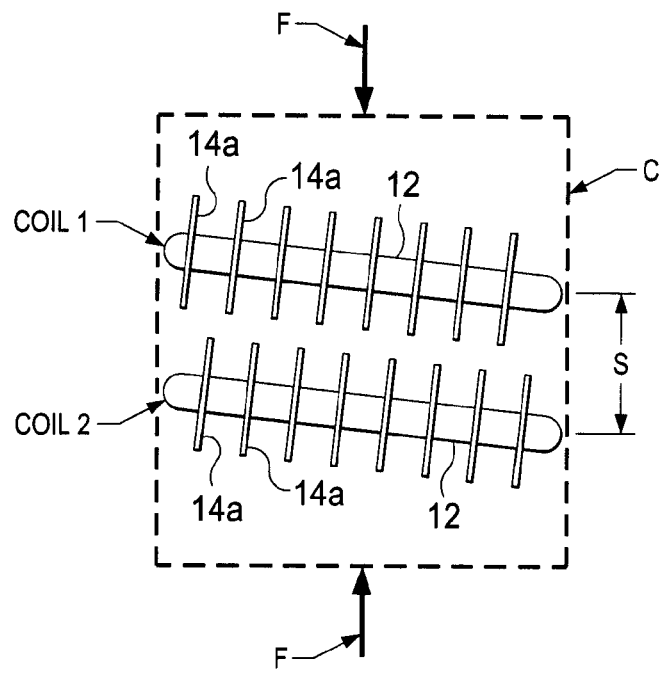
Figure 5C:
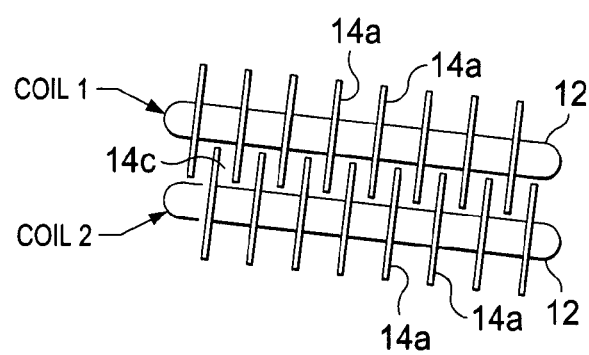

FIGS. 5A-5C schematically depict an embodiment of a manufacturing method for constructing the helical fin/tube heat exchanger coil 10 described above. In constructing the coil 10 a length of a heat conductive finned metal tubing structure 12,14 is provided as shown in FIG. 5A. On the side of the tubing 12 which will face laterally outwardly in the completed coil 10 the fin edges 14a are suitably deformed to provide them with their previously described laterally inwardly bent, circumferentially folded over, generally V-shaped configurations (but are schematically shown as single lines in FIGS. 5A-5C for purposes of illustrative and descriptive clarity).

Next, as schematically depicted in FIG. 5B, the finned tubing structure 12,14 is suitably coiled around the longitudinal axis A (see FIG. 2) to form a helically coiled finned tubing array C in which the axially adjacent tubing coil pairs (for example, the depicted coils 1 and 2) are spaced apart from one another a sufficiently large axially distance S such that the facing edge portions of the deformed fin sections 14a in each adjacent coil pair are in a non-nesting relationship.

Axially inwardly directed forces F are then suitably exerted on the coiled tubing array C in a manner such that, as schematically depicted in FIG. 5C, the axial length of the coil array C is shortened to an extent that opposing edge portions of the deformed fin sections 14a in each axially adjacent tubing coil pair are moved into a nesting relationship to form in the coil 10 the previously described seal areas 14c. Finally, to prevent the axially compressed spiraling tubing 12 from springing back to its FIG. 5B orientation and de-nesting the interdigitated fin portions 14a when the force F is terminated, the adjacent coil pairs are suitably retained in their closer FIG. 5C orientations. This positional retention may be achieved in a variety of manners well known to those of ordinary skill in the art of fabricating spring-shaped metal structures and include, but are not limited to, mechanically intersecuring the coils to one another in their FIG. 5C adjacent orientation or otherwise mechanically preventing spring-back of array C from its FIG. 5C orientation to its prior FIG. 5B orientation, or relieving the spring-back force in the tubing 12 in a suitable manner such as by stress relieving the tubing 12 by appropriately heat treating it in its FIG. 5C axially compressed orientation while maintaining the force F thereon.

While the helical fin/tube heat exchanger coil 10 has been representatively described as being incorporated in a fuel-fired pool heater, it will be readily appreciated by those of skill in this particular art that it could be alternatively incorporated in fluid heating apparatus of other types, such as water heaters, boilers, or apparatus for heating fluids other than water, without departing from principles of the present invention.

The foregoing detailed description is to be clearly understood as being given by way of illustration and example only, the spirit and scope of the present invention being limited solely by the appended claims.

What is claimed is:

1. A heat exchanger comprising:
   a heat conductive tubular member helically coded about a longitudinal axis and having longitudinally spaced apart coils; and
   a series of heat transfer fins circumscribing the coiled tubular member and being spaced apart along its length in a heat conductive relationship therewith,
      the fins on longitudinally adjacent pairs of coils of said tubular member having nested facing edge portions which collectively form a nested fin area that coils between the tubular member adjacent coil pairs in axially spaced relationships therewith, said nested fin area substantially impeding fluid flow therethrough in a direction generally transverse to said longitudinal axis, and the heat transfer fins also having laterally outer portions that are laterally inwardly bent relative to said longitudinal axis to a generally V-shaped configuration, and circumferentially folded over one another relative to said longitudinal axis.

2. The heat exchanger of claim 1 wherein:
   said heat transfer fins are integral with said tubular member.

3. The heat exchanger of claim 2 wherein:
   said heat transfer fins are defined by a portion of said tubular member that externally spirals along the length of the balance of said tubular member.

4. The heat exchanger of claim 1 wherein:
   said heat transfer fins are defined by a heat transfer structure that externally spirals along the length of said tubular member.

5. The heat exchanger of claim 1 wherein:
   said laterally outer portions are deformed to define through said heat transfer fins a coiled, circumferentially spaced series of restricted fluid outlets in substantial axial alignment with said helically coiled heat conductive tubular member.

6. The heat exchanger of claim 5 wherein:
   said laterally outer portions of said heat transfer fins have apex portions that collectively define a series of baffle outlet openings.

7. The heat exchanger of claim 1 wherein:
   said heat exchanger is configured to be operatively incorporated in a fuel-fired pool heater.

8. Heating apparatus comprising a heat exchanger having an externally finned heat conductive tubular member deformed around a longitudinal axis to a helically coiled configuration in which facing fin edge portions in axially adjacent coil pairs of said tubular member are nested with one another to collectively form a nested fin area between said axially adjacent coil pairs of said tubular member, the nested fin area substantially impeding fluid flow therethrough the, externally finned heat conductive tubular member comprising laterally outer portions that are laterally inwardy bent relative to said longitudinal axis to a generally V-shaped configuration, and circumferentially folded over one another relative to said longitudinal axis.

9. The heating apparatus of claim 8 further comprising:
   combustion apparatus for flowing hot combustion gas outwardly through said externally finned tubular member in a direction generally transverse to said longitudinal axis.

10. The heating apparatus of claim 9 wherein:
    said combustion apparatus comprises a fuel burner circumscribed by said externally finned tubular member.

11. The heating apparatus of claim 8 wherein:
    said heating apparatus is a liquid heating apparatus.

12. The heating apparatus of claim 8 wherein:
    said heating apparatus is a fuel-fired pool heater.

13. A method of constructing a heat exchanger comprising:
    providing a length of heat exchanger tubing having a longitudinally spaced series of external fins thereon;
    helically coiling said tubing about a longitudinal axis;
    axially compressing the helically coiled tubing to cause facing edge portions of the fins in adjacent pairs of tubing coils to nest with one another in a manner forming from the nested fin portions a nested fin area in said heat exchanger, the nested fin area substantially impeding fluid flow therethrough; and
    retaining the facing fin edge portions in nested orientations, wherein said deforming step is performed in a manner such that the deformed, generally triangularly shaped outer side portions of said fins have apex portions shaped to define fluid discharge openings communicating with an interior portion of heat exchanger circumscribed by the helically coiled tubing.

14. A heat exchanger constructed by the method of claim 13.

15. The method of claim 13 wherein said external fins have outer side portions, and said method further comprises the step, performed prior to the coiling step, of:

deforming outer side portions of said fins to generally triangular shapes by inwardly bending said outer side portions and circumferentially overlapping said outer side portions of said fins, opposing corner portions of the deformed outer side portions of said fins defining said facing edge portions of said fins.

16. A heat exchanger constructed by the method of claim 15.

17. The method of claim 13 wherein:

said providing step is performed by providing a length of heat exchanger tubing having a longitudinally spaced series of integral external fins thereon.

18. A heat exchanger consructed by the method of claim 17.

* * * * *